United States Patent
Roh

(10) Patent No.: US 9,786,217 B2
(45) Date of Patent: Oct. 10, 2017

(54) ORGANIC LIGHT EMITTING DISPLAY DEVICE AND DRIVING METHOD THEREOF

(71) Applicant: SAMSUNG DISPLAY CO., LTD., Yongin, Gyunggi-Do (KR)

(72) Inventor: Hyun-Suk Roh, Yongin (KR)

(73) Assignee: SAMSUNG DISPLAY CO., LTD., Yongin, Gyunggi-Do (KR)

( * ) Notice: Subject to any disclaimer, the term of this patent is extended or adjusted under 35 U.S.C. 154(b) by 649 days.

(21) Appl. No.: 13/752,755

(22) Filed: Jan. 29, 2013

(65) Prior Publication Data

US 2014/0104326 A1  Apr. 17, 2014

(30) Foreign Application Priority Data

Oct. 15, 2012  (KR) .................. 10-2012-0114221

(51) Int. Cl.
  *G09G 3/3208*  (2016.01)
  *G09G 3/20*  (2006.01)
  *H04N 13/04*  (2006.01)

(52) U.S. Cl.
  CPC ......... *G09G 3/3208* (2013.01); *G09G 3/2022* (2013.01); *H04N 13/0438* (2013.01); *G09G 2300/0823* (2013.01); *G09G 2320/0209* (2013.01)

(58) Field of Classification Search
  CPC ............... G09G 3/3208; G09G 3/2022; G09G 2300/0823; H04N 13/0438
  See application file for complete search history.

(56) References Cited

U.S. PATENT DOCUMENTS

| | | | | |
|---|---|---|---|---|
| 8,520,038 B2* | 8/2013 | Nobori | ............... | H04N 13/0018 345/690 |
| 8,633,974 B2* | 1/2014 | Kang | ................. | G02B 27/2228 345/204 |
| 8,836,634 B2* | 9/2014 | Lee | .................... | G02B 27/2264 345/102 |
| 2008/0037120 A1* | 2/2008 | Koo | .................. | G02B 27/2214 359/463 |
| 2008/0151040 A1* | 6/2008 | Kim | ............................. | 348/42 |
| 2008/0198920 A1 | 8/2008 | Yang et al. | | |

(Continued)

FOREIGN PATENT DOCUMENTS

| KR | 10-2006-0114131 A | 11/2006 |
|---|---|---|
| KR | 10-2009-0123896 A | 12/2009 |
| KR | 10-2010-0012247 A | 2/2010 |

*Primary Examiner* — Kumar Patel
*Assistant Examiner* — Sejoon Ahn
(74) *Attorney, Agent, or Firm* — Lee & Morse, P.C.

(57) ABSTRACT

An organic light emitting display device includes a scan driving unit that supplies scan signals to scan lines, a data conversion unit that receives a first data signal for displaying an image and converts the first data signal to create a second data signal; a data driving unit that supplies the first data signal and the second data signal to data lines; a pixel unit including pixels positioned at intersections of the scan lines with the data lines, the pixels emitting light having a luminance corresponding to the first data signal during an image display subperiod and having a luminance corresponding to the second data signal during a compensation subperiod; and an image selection unit that transmits an image corresponding to the first data signal and blocking an image corresponding to the second data signal.

13 Claims, 4 Drawing Sheets

(56) References Cited

U.S. PATENT DOCUMENTS

| | | | |
|---|---|---|---|
| 2010/0020051 A1 | 1/2010 | Kim et al. | |
| 2010/0060720 A1* | 3/2010 | Hirasawa | G06T 7/0022 348/49 |
| 2010/0091095 A1* | 4/2010 | Sung et al. | 348/53 |
| 2010/0253678 A1* | 10/2010 | Choi | H04N 13/0454 345/419 |
| 2011/0025671 A1* | 2/2011 | Lee | 345/211 |
| 2011/0063422 A1* | 3/2011 | Yoo | 348/54 |
| 2011/0149052 A1* | 6/2011 | Bai et al. | 348/54 |
| 2011/0187822 A1* | 8/2011 | Yoo | 348/43 |
| 2011/0193891 A1* | 8/2011 | Lee et al. | 345/690 |
| 2011/0273480 A1* | 11/2011 | Park | G02B 27/2264 345/690 |
| 2012/0001956 A1* | 1/2012 | Sato | H04N 13/0409 345/690 |
| 2012/0007895 A1* | 1/2012 | Kim | H04N 13/0025 345/690 |
| 2012/0026155 A1* | 2/2012 | Komiya | G09G 3/003 345/213 |
| 2012/0038635 A1* | 2/2012 | Stamate | H04N 13/0278 345/419 |
| 2012/0113102 A1* | 5/2012 | Sato | H04N 13/0438 345/419 |
| 2012/0176373 A1* | 7/2012 | Haga | H04N 13/0007 345/419 |
| 2012/0268461 A1* | 10/2012 | Park et al. | 345/419 |
| 2012/0293488 A1* | 11/2012 | Niu | H04N 13/0025 345/419 |
| 2013/0070005 A1* | 3/2013 | Tokumura | G09G 3/003 345/691 |
| 2013/0120363 A1* | 5/2013 | Kang | H04N 13/0438 345/419 |
| 2013/0321364 A1* | 12/2013 | Chong | G09G 3/3208 345/204 |
| 2015/0042752 A1* | 2/2015 | Pettersson | H04N 13/0007 348/42 |

* cited by examiner (a) Person 1    Person 2
(b) Left Eye    Right Eye (a)  Person 1        Person 2
(b)  Left Eye        Right Eye

ORGANIC LIGHT EMITTING DISPLAY DEVICE AND DRIVING METHOD THEREOF

CROSS-REFERENCE TO RELATED APPLICATION

This application claims priority under 35 U.S.C. §119 to Korean Patent Application No. 10-2012-0114221, filed on Oct. 15, 2012, in the Korean Intellectual Property Office, the entire contents of which are incorporated herein by reference.

BACKGROUND

1. Field

Embodiments relate to an organic light emitting display device and a driving method thereof, and more particularly, to an organic light emitting display device capable of preventing an image sticking phenomenon and a driving method thereof.

2. Description of the Related Art

Recently, various flat panel display devices capable of reducing weight and volume, which are disadvantages of a cathode ray tube, have been developed. Such flat panel display devices include a liquid crystal display (LCD), a field emission display (FED), a plasma display panel (PDP), an organic light emitting display (OLED), and the like.

Among them, the organic light emitting display device, which displays an image using an organic light emitting diode generating light by recombination between electrons and holes, has advantages in which it has a rapid response speed and is simultaneously driven at a low power.

SUMMARY

Embodiments are directed to an organic light emitting display device including a scan driving unit that supplies scan signals to scan lines, a data conversion unit that receives a first data signal for displaying an image and converts the first data signal to create a second data signal, a data driving unit that supplies the first data signal and the second data signal to data lines, a pixel unit including pixels positioned at intersections of the scan lines with the data lines, the pixels emitting light having a luminance corresponding to the first data signal during an image display subperiod and having a luminance corresponding to the second data signal during a compensation subperiod, and an image selection unit that transmits an image corresponding to the first data signal and blocking an image corresponding to the second data signal.

The data conversion unit may invert the first data signal to create the second data signal.

The first data signal may include a first image signal for displaying a first image and a second image signal for displaying a second image.

The second data signal may include a first inversion signal by which the first image signal is inverted and a second inversion signal by which the second image signal is inverted.

The pixel unit may display a plurality of images corresponding to each of the first image signal, the second image signal, the first inversion signal, and the second inversion signal during different subperiods within one frame period.

The second data signal may be an inversion signal by which an image signal obtained by summing the first image signal and the second image signal is inverted.

The pixel unit may display a plurality of images corresponding to each of the first image signal, the second image signal, and the second data signal during different subperiods in one frame period.

The image selection unit may be a pair of 3D glasses including a left-eye lens transmitting an image corresponding to the first image signal and a right-eye lens transmitting an image corresponding to the second image signal.

The image selection unit may include a first image selection unit transmitting an image corresponding to the first image signal and a second image selection unit transmitting an image corresponding to the second image signal.

The image display subperiod and the compensation subperiod may be alternately disposed during one frame period.

Embodiments are also directed to a driving method of an organic light emitting device, the method including receiving a first data signal for displaying an image, converting the first data signal to create a second data signal, displaying an image corresponding to the first data signal during an image display subperiod, displaying an image corresponding to the second data signal during a compensation subperiod, and transmitting the image corresponding to the first data signal and blocking the image corresponding to the second data signal.

A frame period may be divided such that the image display subperiod and the compensation subperiod are alternately displayed.

The first data signal may be inverted to create the second data signal.

The first data signal may include a first image signal for displaying a first image and a second image signal for displaying a second image.

The second data signal may include a first inversion signal and a second inversion signal. Converting the first data signal to create the second data signal may include inverting the first image signal to create the first inversion signal and inverting the second image signal to create the second inversion signal.

A plurality of images may be displayed corresponding to each of the first image signal, the second image signal, the first inverted signal, and the second inverted signal during different subperiods in one frame period.

An image signal obtained by summing the first image signal and the second image signal may be inverted to create the second data signal.

A plurality of images may be displayed corresponding to each of the first image signal, the second image signal, and the second data signal.

Transmitting an image corresponding to the first data signal may include selectively transmitting an image corresponding to the first image signal and selectively transmitting an image corresponding to the second image signal.

BRIEF DESCRIPTION OF THE DRAWINGS

Features will become apparent to those of ordinary skill in the art by describing in detail exemplary embodiments with reference to the attached drawings in which.

DETAILED DESCRIPTION

Hereafter, exemplary embodiments which those skilled in the art may easily practice will be described below in detail with reference to accompanying FIGS. 1 to 7.

Figure 1:
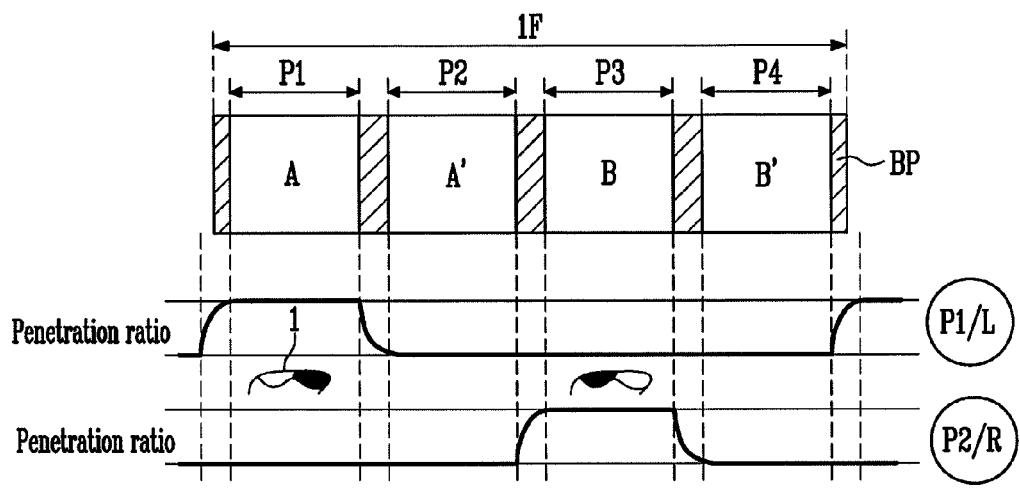
FIG. 1 is a view showing an example of selectively viewing images by an image selection unit during a frame period according to an exemplary embodiment.

FIG. 1 is a view showing an example of selectively viewing images by an image selection unit during a frame period according to an exemplary embodiment. In addition, FIG. 2 is a view separately showing an actually displayed image and an image transferred to a viewer by the image selection unit according to the exemplary embodiment shown in FIG. 1.

Figure 2:
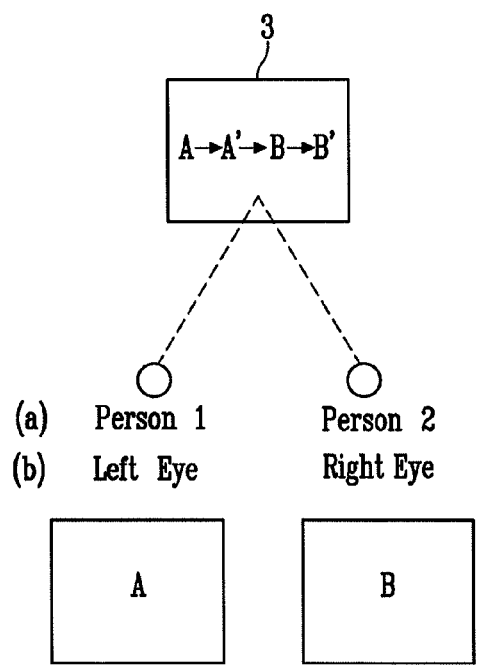
FIG. 2 is a view separately showing an actually displayed image and an image transferred to a viewer by the image selection unit according to the exemplary embodiment shown in FIG. 1.

Referring to FIG. 1 and FIG. 2, one frame period (1F) according to the present exemplary embodiment is divided into image display subperiods P1 and P3 and compensation subperiods P2 and P4 and then driven.

The image display subperiods P1 and P3 are portions of a frame period in which a first data signal for displaying an image intended to actually be perceived is received and its corresponding image is displayed. In the present exemplary embodiment, an A image (first image) and a B image (second image) are displayed, by way of example. The first image signal for displaying the A image and the second image signal for displaying the B image are collectively referred to as the first data signal. When an image selection unit 1 for selectively transmitting the A image and the B image is included, a left-eye image and a right-eye image may be separated from each other to implement a 3D image. In other implementations, a dual-view scheme in which different people are capable of watching different broadcasting programs may be implemented. In still other implementations, modifications and variations may be made so that one image may be displayed during a frame period.

Compensation subperiods P2 and P4 are portions of the frame period in which a compensation image is provided for compensating for the light emitting difference between pixels that may occur during the image display subperiods P1 and P3. The compensation subperiods P2 and P4, which allow the light emitting times of pixels to be similar or constant, are additionally inserted subperiods in order to keep the deterioration degrees of pixels uniform. To this end, during the compensation subperiods P2 and P4, pixels receive a second data signal for compensating for light emitting difference between pixels generated in the process of displaying the image by the first data signal. During such compensation subperiods P2 and P4 pixels display the compensation image corresponding to the second data signal.

Therefore, the image from the first data signal and the image from the second data signal are set to be different from each other. For example, a pixel emitting light at a high luminance during the image display subperiods P1 and P3 may be set to emit light at a low luminance or not to emit light at all during the compensation subperiods P2 and P4. A pixel emitting light at a low luminance or emitting no light at all during the image display subperiods P1 and P3 may be set to emit light at a high luminance during the compensation subperiods P2 and P4.

To this end, as an example, the second data signal may be set to a data signal created by inverting the first data signal. For example, the second data signal may include a first inversion signal by which the first image signal for displaying the A image is inverted and a second inversion signal by which the second image signal for displaying the B image is inverted. In this case, an A' image corresponding to the first inversion signal may be set to be the inverted image of the A image, and a B' image may be set to be the inverted image of the B image.

The panel 3 displays images corresponding to the first image signal, second image signal, first inversion signal, and second inversion signal during the different subperiods P1, P2, P3, and P4, respectively. It may be possible to arbitrarily set the order of displaying images by the first image signal, second image signal, first inversion signal, and the second inversion signal. For example, the panel 3 may sequentially display an A image corresponding to the first image signal, an A' image corresponding to the first inversion signal, a B image corresponding to the second image signal, and a B' image corresponding to the second inversion signal.

In order to reduce the possibility of an/or prevent a crosstalk phenomenon between images, a non-light emitting subperiod BP, in which light emission is stopped for a time interval equivalent to the response time of the image selection unit 1 (which may be 3D glasses), may be further inserted between subperiods P1, P2, P3, and P4, during which each image is displayed.

In the image display method according to the present exemplary embodiment, the panel 3 may sequentially display the A image, the A' image, the B image, and the B' image during the first to fourth subperiods P1 to P4.

To this end, the panel receives the first data signal for displaying the A and B images intended to be actually perceived and also receives or creates the second data signal for displaying the A' image and the B' image. The above-mentioned panel 3 is controlled by the timing control unit, or the like, to display images in a predetermined order, for example, in order of the A image, the A' image, the B image, and the B' image.

However, all images displayed on the panel 3 are not rendered to the viewer, and the viewer watches only the image he or she desires to see using the image selection unit 1.

For example, in the case in which the image selection unit 1 is a pair of 3D glasses including a left-eye lens transmitting the A image corresponding to the first image signal and a right-eye lens transmitting the B image corresponding to the second image signal, the view recognizes the image as a 3D image by seeing the A image with the left eye and the B image with the right eye. Here, compensation images compensating for the light emitting difference between pixels, that is, the A' image and the B' image are blocked by the image selection unit 1. Therefore the A' image and the B' image are not rendered to the viewer.

In addition, in the case in which the image selection unit 1 includes a first image selection unit transmitting the A image corresponding to the first image signal and a second image selection unit transmitting the B image corresponding to the second image signal, it is possible to implement a dual-view scheme allowing different images to be watched through one panel 3 by different viewers wearing the first and second image selection units, respectively.

The image display subperiods P1 and P3 and the compensation subperiods P2 and P4 may be alternately disposed during one frame period 1F. However, although one frame period 1F is divided into the image display subperiods P1 and P3 and the compensation subperiods P2 and P4, due to characteristics of the organic light emitting display device having a fast response time, it is possible to provide additional compensation subperiods as well as the 3D image or the dual view scheme.

As described above, when compensation images compensating for the light emitting difference between pixels are displayed between displayed images, the light emitting times of pixels may generally be made uniform. Therefore, the degrees of deterioration of pixels may be made equal or similar to each other to reduce or prevent the image sticking phenomenon due to a luminance difference between pixels, thereby making it possible to improve the image quality.

Figure 3:
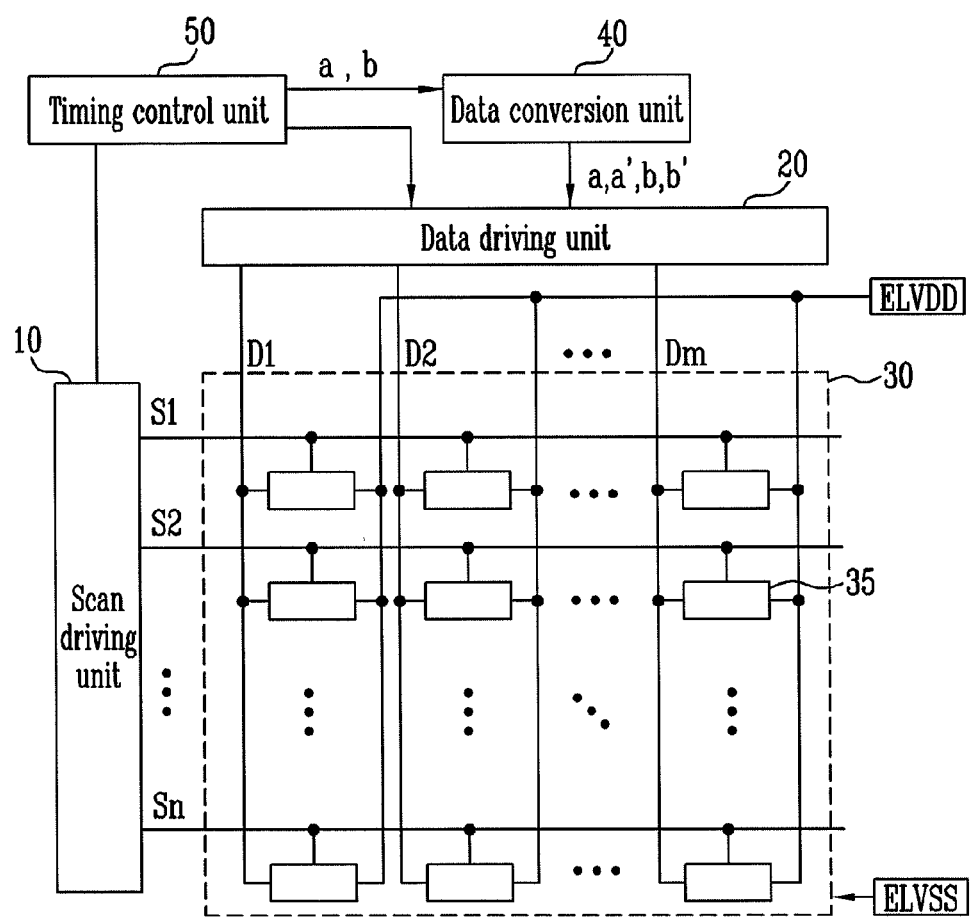
FIG. 3 is a view showing an organic light emitting display device according to an exemplary embodiment.

FIG. 3 is a view showing an organic light emitting display device according to an exemplary embodiment.

Referring to FIG. 3, the organic light emitting display device includes a scan driving unit 10, a data driving unit 20, a pixel unit 30, and a data conversion unit 40, and a timing control unit 50.

The scan driving unit 10 supplies scan signals sequentially to the scan lines S1 to Sn to drive the scan lines S1 to Sn. When the scan signals are supplied to the scan lines S1 to Sn, the pixels 35 are selected in a horizontal line unit. Particularly, in the case in which the scan driving unit 10 is to supply a plurality of scan signals during one frame period 1F, the scan driving unit 10 selects each horizontal line a plurality of times during one frame period 1F. For example, as shown in FIG. 1, when the A image, A' image, B image, and B' image are displayed during a frame period 1F, the scan driving unit 10 may sequentially select each horizontal line of the pixel unit 30 four times during the frame period 1F.

The data driving unit 20 supplies data signals to the data lines D1 to Dm to drive the data lines D1 to Dm so as to be synchronized with scan signals. For example, as shown in FIG. 1, in the case in which the A image, the A' image, the B image, and the B' image are displayed, the data driving unit 20 may supply the first image signal a, the first inversion signal a', the second image signal b, and the second inversion signal b' sequentially to the pixels selected by the scan signal. The first image signal a, the first inversion signal a', the second image signal b, and the second inversion signal b' may be supplied from the data conversion unit 40 and/or the timing control unit 50 to the data driving unit 20. For example, the data driving unit 20 may receive the first image signal a, the first inversion signal a', the second image signal b, and the second inversion signal b' from the data conversion unit 40, or may receive the first and second image signals a and b from the timing control unit 50 and the first and second inversion signals a' and b' from the data conversion unit 40.

The pixel unit 30 includes a plurality of pixels 35 positioned at intersections of the scan lines S1 to Sn with the data lines D1 and Dm to display images corresponding to the data signals from the data lines D1 to Dm. Particularly, in the case in which the pixel unit 30 is set to display a plurality of images during one frame period 1F, the pixels 35 are selected a plurality of times to receive a plurality of data signals and emit light at a luminance corresponding to each of the data signals. That is, pixels emit light having luminance corresponding to the first data signals a and b during the image display subperiods P1 and P3 and emit light having a luminance corresponding to the second data signals a' and b' during the compensation subperiods P2 and P4. Power may be supplied to the pixel unit by a first power supply ELVDD and a second power supply ELVSS.

The data conversion unit 40 receives the first data signals a and b for displaying actual images from the timing control unit 50, or the like, and converts the received signals to create the second data signal a' and b'. For example, the data conversion unit 40 may create the second data signals a' and b' by inverting the first data signals a and b and may supply the created signal to the data driving unit 20.

Here, in the case in which the pixel unit 30 displays, together with a plurality of images (that is, A image and B image) intended to be actually perceived, a plurality of compensation images (that is, A' image and B' image) not intended to be perceived, each of which are the inverted image of each of the plurality of images, as shown in FIG. 1, the data conversion unit 40 may create a plurality of second data signals a' and b' corresponding to the plurality of first data signals a and b, respectively, and supply the created signals to the data driving unit 20. In other implementations, the data conversion unit 40 may recognize, by summing the plurality of first data signals a and b, the luminance difference between pixels 35 generated when the plurality of images (A image and B image) are displayed by the plurality of first data signals a and b, and may create only one second data signal capable of generally compensating for the luminance difference.

In FIG. 3, the data conversion unit 40 supplies all data signals (a, a', b, b') to the data driving unit 20. In other implementations, the first data signals a and b may be directly supplied to the data driving unit 20 by the timing control unit 50, and the data conversion unit 40 may supply only the second data signals a' and b' to the data driving unit 20.

The timing control unit 50 supplies driving signals such as clock signals, or the like, to the scan driving unit 10, the data driving unit 20, and the data conversion unit 40 to control operations thereof. In addition, timing control unit 50 supplies the first data signals a and b to the data driving unit 20 and/or the data conversion unit 40.

The organic light emitting display device as described above receives the first data signals a and b for displaying actual images and converts the received signals to create the second data signal a' and b'. The above-mentioned organic light emitting display device displays images (A image and B image) corresponding to the first data signal a and b during the image display subperiods P1 and P2 of one frame period 1F and displays images (A' image and B' image) corresponding to the second data signal a' and b' during the compensation subperiods P2 and P4 of the one frame period 1F. The order of displaying images may be arbitrarily set.

The organic light emitting display device includes the image selection unit 1 shown in FIG. 1, that is, the image selection unit 1 transmitting images (A image and B image) by the first data signals a and b and blocking images (A' image and B' image) corresponding to the second data signals a' and b'. Therefore, during a selecting of images, only images (A image and B image) corresponding to the first data signals a and b are transmitted to the viewer. In the case of driving the organic light emitting display device in the 3D or dual view scheme, selecting images may include transmitting each of the plurality of first data signals a and b during one frame period 1F. For example, selecting images may include selectively transmitting the image (A image)

corresponding to the first image signal a and selectively transmitting the image (B image) corresponding to the second image signal b.

As described above, in the organic light emitting display device and the driving method thereof, the compensation image is displayed between transmitted images in order to compensate for the light emitting difference between pixels. Thereby, it may be possible to keep a deterioration degree between pixels 35 equal or similar to each other. Here, images (A image and B image) intended to be actually perceived may be transmitted and compensation images (A' image and B' image) may be blocked by the image selection unit 1, thereby making it possible to transfer the images intended to be actually perceived to the viewer. Therefore, the actual image is effectively transmitted and the luminance difference due to a deterioration difference between pixels may be simultaneously reduced or prevented, thereby making it possible to reduce or prevent the image sticking phenomenon and improve the image quality.

Figure 4:
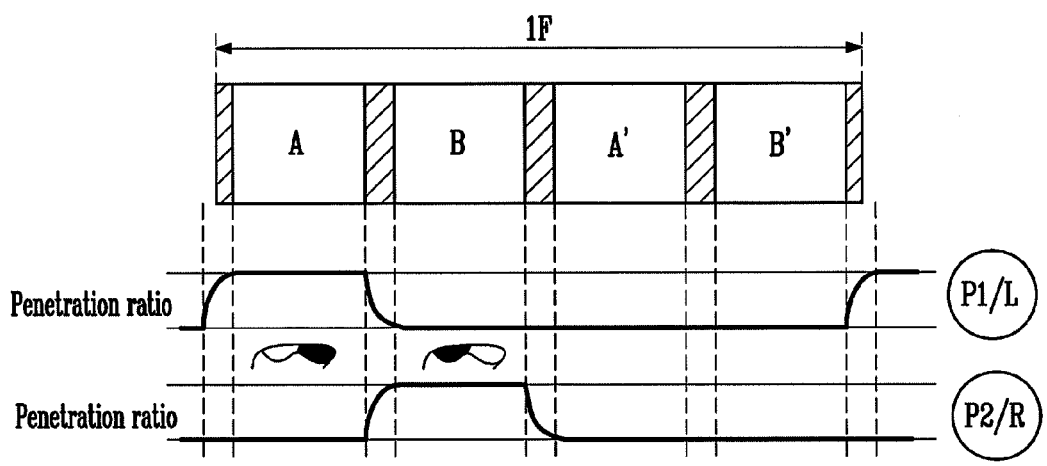
FIG. 4 is a view showing an example of selectively viewing images by a frame period and an image selection unit according to an exemplary embodiment.
Figure 5:
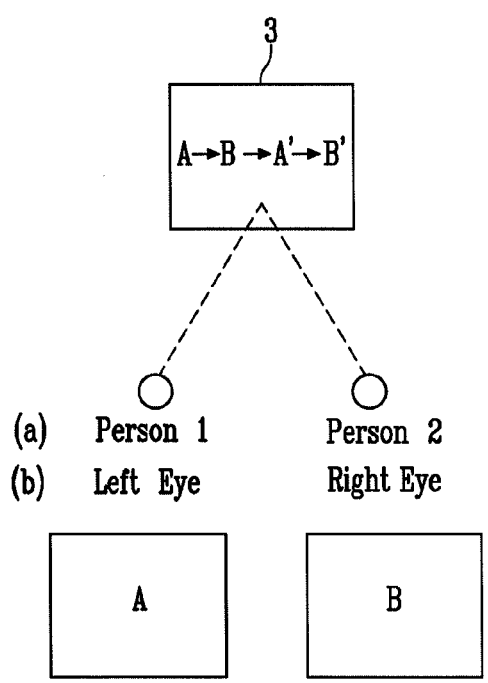
FIG. 5 is a view separately showing an actually displayed image and an image transferred to a viewer by the image selection unit according to the exemplary embodiment shown in FIG. 4.

FIG. 4 is a view showing an example of selectively viewing images within a frame period and an image selection unit according to another exemplary embodiment. In addition, FIG. 5 is a view separately showing an actually displayed image and an image transferred to a viewer by the image selection unit according to the exemplary embodiment shown in FIG. 4. In describing FIGS. 4 and 5, a detailed description of the same components as or components similar to those in FIGS. 1 and 2 will not be repeated.

Referring to FIGS. 4 and 5, in the present exemplary embodiment, the A image and B image intended to be actually perceived are first displayed and then the A' image for compensating for the light emitting difference between pixels corresponding to the A image and the B' image for compensating for the light emitting difference between pixels corresponding to the B image are sequentially displayed.

As described above, the order of displaying a plurality of images during one frame period 1F may be freely changed and performed.

Figure 6:
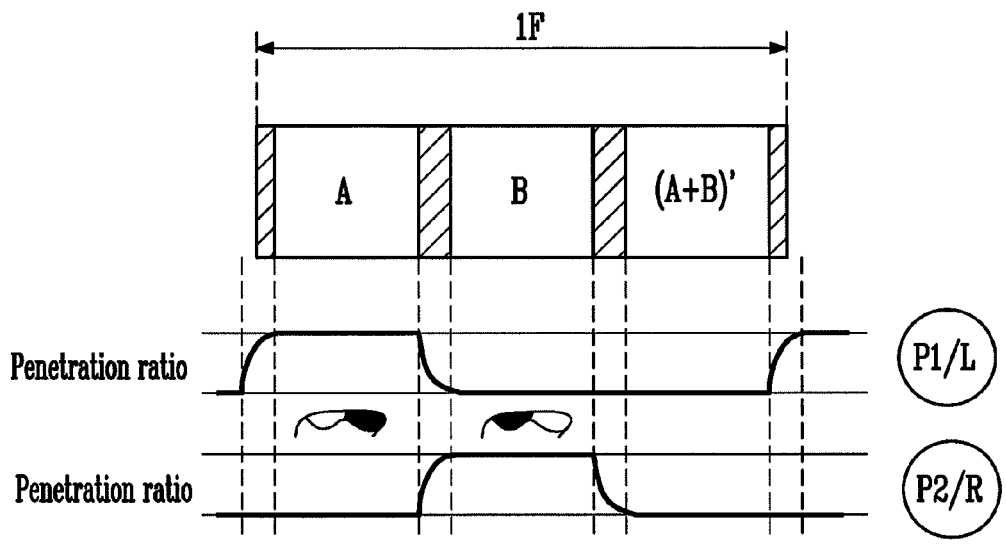
FIG. 6 is a view showing an example of selectively viewing images by an image selection unit during a frame period according to an exemplary embodiment.
Figure 7:
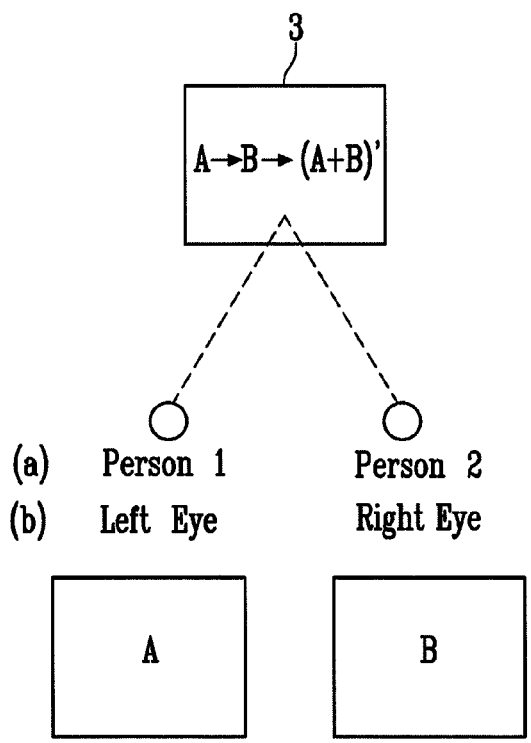
FIG. 7 is a view separately showing an actually displayed image and an image transferred to a viewer by the image selection unit according to the exemplary embodiment shown in FIG. 6.

FIG. 6 is a view showing an example of selectively viewing images by a frame period and an image selection unit according to another exemplary embodiment. FIG. 7 is a view separately showing an image to be actually displayed and an image transferred to a viewer by the image selection unit according to the exemplary embodiment shown in FIG. 6. In describing FIGS. 6 and 7, a detailed description of the same components as or components similar to those in FIGS. 1 and 2 will not be repeated.

Referring to FIGS. 6 and 7, only one compensation image (hereinafter, (A+B)' image) for the plurality of images, that is, the A image and the B image may be displayed. However, the (A+B)' image may be set to generally compensate for the light emitting difference between pixels generated when the A image and the B image are displayed. For example, by inverting an image signal obtained by summing the first image signal for displaying the A image and the second image signal for displaying the B image, a second data signal for displaying the (A+B)' image may be created. Here, "sum" may not refer to a simple addition but may refer to a computation in consideration of all the first image signals and the second image signals. For example, the second data signal may be created by inverting an average of the light emitting times of pixels by the first image signals and second image signals.

In this case, the pixel unit may sequentially display the A image, the B image, and the (A+B)' image corresponding to the first image signal, the second image signal, and the second data signal, respectively, during different subperiods in one frame period 1F. The order of displaying images may be changed. As described above, in the case in which one compensation image is displayed for the plurality of images, time of maintaining each image may increase.

By way of summation and review, an organic light emitting diode, which is a kind of self-light emitting element, may deteriorate over time, leading to a deterioration of luminance. Particularly, an organic light emitting diode that has emitted a larger amount of light may exhibit a higher degree of luminance deterioration than an organic light emitting diode that has emitted a lesser amount of light. Therefore, in an organic light emitting display device, a luminance difference between pixels may occur over time and this luminance difference may cause a sticking phenomenon such that an image quality of the organic light emitting display device may deteriorate.

According to the organic light emitting device and the driving method thereof, as described above, in a relatively simple and real time scheme to additionally insert compensation images, the light emitting difference between pixels may be compensated for. Accordingly, the image sticking phenomenon may be efficiently reduced or prevented without adding a complicated hardware system. In addition, the original image may be displayed by the original data signal (first data signal). Accordingly, there may be little or no risk that the original image may be deteriorated. Therefore, image quality deterioration of the organic light emitting display device due to the image sticking phenomenon may be efficiently reduced and/or prevented.

As set forth above, in the organic light emitting display device and the driving method thereof, the compensation image is displayed between displayed images in order to compensate for the light emitting difference between pixels, thereby making it possible to keep deterioration degrees between pixels constant or similar to each other. Using the image selection unit, the image intended to be actually perceived is transmitted and the compensation image is blocked, thereby making it possible to transmit only the image intended to be actually perceived to the viewer. Therefore, the actual image may be effectively transmitted and the luminance difference between pixels may be reduced or prevented, thereby making it possible to reduce or prevent the image sticking phenomenon and improve the image quality.

While the embodiments have been described in connection with certain exemplary embodiments, it is to be understood that the embodiments are not limited to the exemplary embodiments, but, on the contrary, it is intended that various modifications and equivalent arrangements be included within the spirit and scope of the appended claims, and equivalents thereof.

What is claimed is:

1. An organic light emitting display device, comprising: a scan driver that supplies scan signals to scan lines;
   a data converter that receives a first data signal for displaying an image and converting the first data signal to create a second data signal;
   a data driver that supplies the first data signal and the second data signal to data lines;
   a pixel array including pixels positioned at intersections of the scan lines with the data lines, the pixels:
   displaying a display image by emitting light having a luminance corresponding to the first data signal during an image display subperiod, and
   displaying a compensation image having a luminance corresponding to the second data signal during a compensation subperiod, the compensation image having an inverted luminance relative to the display image; and an image selector that transmits the display image corresponding to the first data signal and that blocks the compensation image corresponding to the second data signal, wherein the first data signal includes a first image signal for displaying a first display image and a second image signal for displaying a second display image, wherein the second data signal includes a first inversion signal by which the first image signal is inverted and a second inversion signal by which the second image signal is inverted, and wherein the pixel array displays a plurality of images corresponding to each of the first image signal, the second image signal, the first inversion signal, and the second inversion signal during different subperiods within one frame period.

2. The organic light emitting display device of claim 1, wherein the data converter inverts the first data signal to create the second data signal.

3. The organic light emitting display device of claim 1, wherein the second data signal is an inversion signal by which an image signal obtained by summing the first image signal and the second image signal is inverted.

4. The organic light emitting display device of claim 3, wherein the pixel array displays a plurality of images corresponding to each of the first image signal, the second image signal, and the second data signal during different subperiods in one frame period.

5. The organic light emitting display device of claim 1, wherein the image selector is a pair of 3D glasses including a left-eye lens transmitting the first display image corresponding to the first image signal and a right-eye lens transmitting the second display image corresponding to the second image signal.

6. The organic light emitting display device of claim 1, wherein the image selector includes a first image selector transmitting the first display image corresponding to the first image signal and a second image selector transmitting the second display image corresponding to the second image signal.

7. The organic light emitting display device of claim 1, wherein the image display subperiod and the compensation subperiod are alternately disposed during one frame period.

8. A driving method of an organic light emitting device, the method comprising:

receiving a first data signal for displaying a display image; converting the first data signal to create a second data signal; displaying the display image corresponding to the first data signal during an image display subperiod;

displaying a compensation image corresponding to the second data signal during a compensation subperiod, the compensation image having an inverted luminance relative to the display image; and transmitting the display image corresponding to the first data signal and blocking the compensation image corresponding to the second data signal, wherein the first data signal includes a first image signal for displaying a first display image and a second image signal for displaying a second display image, wherein: the second data signal includes a first inversion signal and a second inversion signal, and converting the first data signal to create the second data signal includes inverting the first image signal to create the first inversion signal and inverting the second image signal to create the second inversion signal, and wherein a plurality of images are displayed corresponding to each of the first image signal, the second image signal, the first inversion signal, and the second inversion signal during different subperiods in one frame period.

9. The driving method of claim 8, wherein a frame period is divided such that the image display subperiod and the compensation subperiod are alternately displayed.

10. The driving method of claim 8, wherein the first data signal is inverted to create the second data signal.

11. The driving method of claim 8, wherein an image signal obtained by summing the first image signal and the second image signal is inverted to create the second data signal.

12. The driving method of claim 11, a plurality of images are displayed corresponding to each of the first image signal, the second image signal, and the second data signal.

13. The driving method of claim 8, wherein transmitting the display image corresponding to the first data signal includes selectively transmitting the first display image corresponding to the first image signal and selectively transmitting the second display image corresponding to the second image signal.

* * * * *